No. 860,832. PATENTED JULY 23, 1907.
W. S. SHARPNECK.
ROLLER BEARING.
APPLICATION FILED OCT. 29, 1906.
Fig. 1.
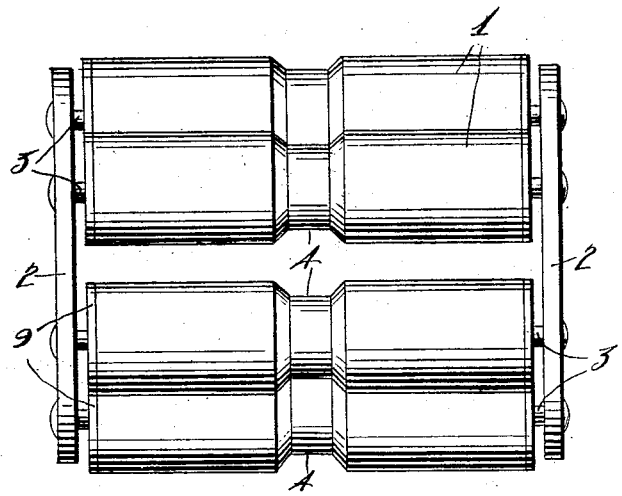
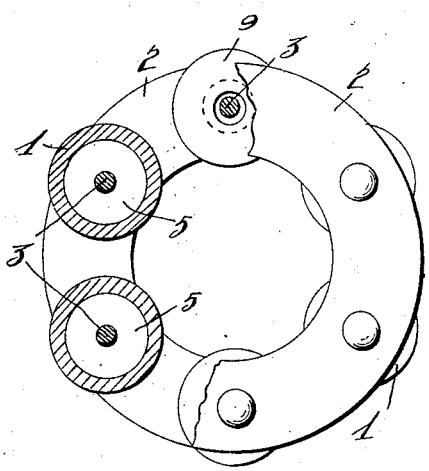
Fig. 2.
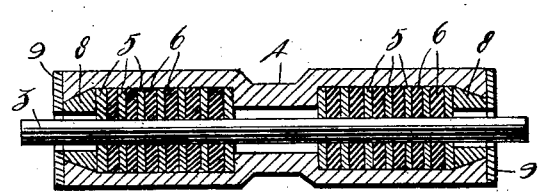
Fig. 3.
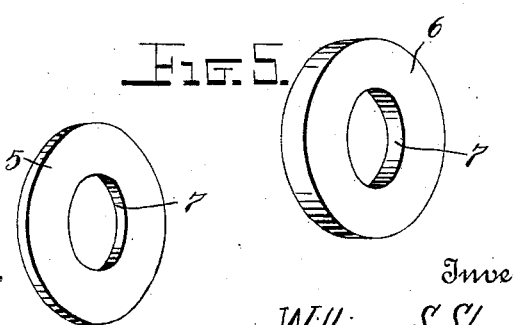
Fig. 4. Fig. 5.
Witnesses
Helge F. Murray
C. H. Griesbauer
Inventor
William S. Sharpneck
by H. B. Willson & Co.
Attorneys

UNITED STATES PATENT OFFICE.

WILLIAM S. SHARPNECK, OF CHICAGO, ILLINOIS, ASSIGNOR OF ONE-HALF TO FREDERICK C. VEHMEYER, OF CHICAGO, ILLINOIS.

ROLLER-BEARING.

No. 860,832.  Specification of Letters Patent.  Patented July 23, 1907.

Application filed October 29, 1906. Serial No. 341,147.

*To all whom it may concern:*

Be it known that I, WILLIAM S. SHARPNECK, a citizen of the United States, residing at Chicago, in the county of Cook and State of Illinois, have invented certain new and useful Improvements in Roller-Bearings; and I do declare the following to be a full, clear, and exact description of the invention, such as will enable others skilled in the art to which it appertains to make and use the same.
This invention relates to improvements in roller bearings.

The object of the invention is to provide a roller bearing, the rollers of which are provided with a self lubricating anti-frictional material, thus increasing the life and usefulness of the bearing, for an indefinite period.

With the above and other objects in view, the invention consists of certain novel features of construction, combination and arrangements of parts, as will be hereinafter described and claimed.
In the accompanying drawings, Figure 1 is a side view of a roller bearing constructed of my improved bearing rollers. Fig. 2 is an end view of the same, parts being broken away and in section. Fig. 3 is a longitudinal sectional view through one of the rollers.
Fig. 4 is a detail perspective view of one of the soft rawhide lubricating washers. Fig. 5 is a similar view of one of the hard rawhide washers which are interposed between the soft washers.

Referring more particularly to the drawings, 1 denotes the bearing rollers arranged in a suitable cage to form a journal bearing for railway car axles or any other form of revolving shaft. The cage for supporting the rollers is here shown as consisting of a pair of rings 2 in which are secured the opposite ends of annular series of cage pins 3 upon which the rollers 1 are revolubly mounted, this arrangement of the cage and rollers being well known and forms no part of the present invention which consists in the construction of the bearing rollers.
The rollers 1 are of hollow or tubular form preferably contracted midway between the ends as shown at 4. In the hollow ends of the rollers are arranged a series of soft flexible rawhide washers 5 between which are arranged a series of hard inflexible rawhide washers 6.
The soft washers 5 are adapted to contain lubricating oil which is absorbed thereby in sufficient quantities to lubricate the rollers 1 for an indefinite period.

The washers 5 and 6 are provided with alined, centrally disposed apertures 7, the diameter of which is such as to closely fit the cage pins 3 upon which the rollers are mounted. After the washers have been ar-
ranged in the rollers as hereinbefore described, steel clamping washers 8 are placed in the ends of the rollers, said washers being frusto-conical in shape, tapering outwardly toward the ends of the rollers as shown. The washers 5 and 6 and the steel washers 8 are tightly compressed and held in the rollers 1 by upsetting or swaging the ends of the rollers on to the frusto-conical surfaces of the steel clamping washers, as shown. The aperture in the steel washers 8 is of greater diameter than the apertures in the rawhide washers, thereby preventing said steel washers from coming into contact with the cage pins. Between the ends of the rollers and the cage rings 2 are arranged spacing washers 9.

By providing soft, lubricant, containing washers and alternating the same with hard washers, a self lubricating anti-frictional bearing is provided which will wear and remain self lubricating for an indefinite length of time. The soft washers contain a sufficient lubricant to properly lubricate the shaft for an indefinite period while the alternating hard washers give rigidity and prevent undue wear and they also hold the rollers in perfect line with the axle.

The bearing or nest of rollers is adapted to be inclosed and supported in any suitable form of casing not shown and is especially adapted for use on railway car axles.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

1. A roller bearing roller having arranged therein a series of soft bearing washers and a series of hard bearing washers arranged between said soft washers and alternating therewith substantially as described.

2. A roller bearing roller having arranged therein a series of soft lubricant containing washers and a series of hard washers arranged between said soft washers and alternating therewith, substantially as described.

3. A roller bearing roller having arranged therein a series of soft lubricant containing rawhide washers, a series of hard rawhide washers, arranged between said soft washers and alternating therewith, and means to tightly compress and hold said washers in said rollers, substantially as described.

4. A hollow roller bearing roller having arranged therein a series of soft, lubricant containing washers, a series of hard washers arranged between and alternating with said soft washers, said soft and hard washers having formed therein alined, centrally disposed apertures to receive the cage pins of the bearing, steel clamping washers arranged in the ends of said roller and means to secure said clamping washers in place, substantially as described.

5. A hollow roller bearing roller having arranged therein a series of soft, lubricant containing washers, a series of hard washers arranged between and alternating with said soft washers, said soft and hard washers having formed therein alined, centrally disposed apertures to receive the cage pins of the bearing and frusto-conical steel clamping washers arranged in the ends of said roller, said steel washers being secured in place by upsetting or swaging the ends of said roller, substantially as described.

In testimony whereof I have hereunto set my hand in presence of two subscribing witnesses.

WILLIAM S. SHARPNECK.

Witnesses:
F. C. VEHMEYER,
JOS. A. VOGLER.